3,197,316
METHOD OF CEMENTING A WELL
Horace J. Beach, Cypress, Tex., assignor to Gulf Oil Corporation, Pittsburgh, Pa., a corporation of Pennsylvania
No Drawing. Filed Aug. 16, 1962, Ser. No. 217,290
3 Claims. (Cl. 106—90)

This invention relates to cement compositions and particularly to compositions to be incorporated in Portland cement used in oil and gas wells. The invention is especially useful in counteracting the effects of drilling mud chemicals which may contaminate Portland cement slurries used for setting casing, liners, or plugs in such wells.

In the drilling of wells by the rotary drilling method, a drilling mud is circulated down the drill pipe and upwardly through the annulus between the drill pipe and the borehole wall to carry the cuttings from the borehole. Another important function of drilling muds is to keep the borehole full of a liquid which exerts a hydrostatic pressure opposing entry of underground formation fluids into the borehole. Drilling muds are aqueous liquids, oils, or emulsions of aqueous liquids and oils which frequently contain a substantial concentration of organic chemical additives to give the drilling mud desired physical and chemical properties. Such additives are, for example, frequently added to drilling muds to modify the viscosity and water-loss characteristics of the drilling mud and to inhibit hydration of shales penetrated during the drilling of the well.

After drilling has been completed, or at an intermediate period during the drilling of the well, it may be necessary to set casing in the borehole or set a plug of cement for a whipstocking operation. The setting of casing is accomplished by pumping cement down through the casing and displacing it upwardly through the annulus between the casing and the borehole wall. A plug is set in the borehole of a well by pumping a cement slurry into the lower end of the borehole through tubing which is withdrawn from the borehold before the cement sets. Although cementing operations are accomplished in a manner to displace drilling mud from the borehole ahead of the cement, there is substantial mixing of the drilling mud and cement after the cement slurry leaves the tubing or casing through which it is pumped to the desired location. The mixing is especially serious in plug setting operations. Cement slurries are capable of withstanding dilution to as much as 60 or 70 percent of the volume of the cement without complete destruction of the compressive strength of the set cement if the diluent does not contain organic chemicals which act as contaminants of cement. However, a very low concentration, usually less than one percent, of some drilling mud additives may contaminate cement slurries sufficiently to prevent setting of the cement.

Recently there has been a marked change in the compositions of drilling muds used in the drilling of many wells. Gypsum has been substituted for calcium hydroxide to reduce to a large extent the gelling of muds at high temperatures. Accompanying the change in the source of calcium has been the substitution of very high concentrations of organic mud chemicals such as chrome-lignins, chrome-lignite, ferrochrome lignosulfonates, other lignosulfonates and lignite for the tannins, starches, sodium carboxymethyl cellulose, and lignins formerly used in low concentrations in drilling muds.

In my Patent No. 2,889,228, entitled, "Protection of Cements From Effects of Contamination," the incorporation of formaldehyde or a mixture of formaldehyde and water-soluble chromates or dichromates in cement slurries to counteract contamination of chemicals is described. Although the mixture of formaldehyde and water-soluble chromates is effective in protecting cements from the effects of tannins, starches, sodium carboxymethyl cellulose, lignite and lignins that were then used in drilling mud, it is not effective in counteracting the ferrochrome and other lignosulfonates nor the chrome-lignite and chrome-lignins now frequently used in drilling muds. Formaldehyde alone is effective at temperatures above about 170° F. in counteracting organic contaminates in cement slurries, but is indiscriminate in its decontaminating effects and may completely neutralize any retarder added to the cement and thereby cause premature setting of the cement slurry.

This invention resides in a method of cementing a well utilizing a novel composition comprising formaldehyde and carboxymethyl cellulose (CMHEC) for incorporation in Portland cement for use in wells at temperatures in the range of about 170° F. to 260° F. to counteract the contaminating effect of ferrochrome lignosulfonates and other drilling mud additives on the setting properties of the cement slurries. The depth of wells in which this novel composition is useful depends on the temperature gradient in the subsurface formations. The invention further resides in procedures for setting casing, liners or plugs in wells adjacent formations at temperatures in the range of about 170° F. to 260° F. utilizing Portland cement slurries containing formaldehyde and CMHEC.

Cements which can most usefully be protected in accordance with this invention are generally referred to as Portland cements and are designated in the industry as API Class A, Class B, and Class C cements. They are described in detail in API Specification for Oil Well Cements and Cement Additives, API standard 10A, 6th Edition, January 1959, issued by the American Petroleum Institute. As shown in the API publication, Class A, Class B, and Class C cements are similar to ASTM Type 1, ASTM Type 2, and ASTM Type 3, respectively, Portland cement. This invention is also effective in counteracting contamination of cements of API Class D and E, which are designed for use in formations at temperatures above 180° F. The term "Portland cements" is used throughout this specification to define cements of the API classes specified above which can be protected by the incorporation of the mixture of formaldehyde and sodium carbonate in accordance with this invention.

Portland cements are frequently modified by the manufacturers to delay setting of cement slurries and thereby increase the time available for pumping the cement from the well head to the bottom of the well. Modification of the setting characteristics may be made by control of the surface area through variation in grinding of the cement, by variation in the mineral constituents of the cement, or a combination of the two methods. Portland cements modified by either of these methods are identified as unretarded slow setting cements. In addition to controlling the rate of setting of cements by control of the surface area and mineral composition of the cement, small amounts of one or more retarding materials are sometimes added for further increasing the thickening time of a cement slurry. Retarders allow control of, and useful increases in, thickening time under conditions of high temperature and pressure, but do not cause a serious reduction in the rate of strength development of the cement. This invention is useful to combat contamination of retarded cements as well as the unretarded cements because even though the mixture of formaldehyde and CMHEC tends to counteract the effect of many retarders, it also acts as a retarder as well as a decontaminant for cementing wells at depths up to approximately 12,000 feet.

Portland cements of the types described above are mixed with water in a ratio of approximately 35 to 55 percent by weight of water, based on the dry cement, to prepare a cement slurry which can be used in oil and gas well cementing operations. The minimum amount of water used is determined by the pumpability of the slurry, while the maximum concentration of water is usually limited by settling of the cement solids from the water.

In the casing setting and plug setting operations described previously, it is generally desirable to have a minimum of two hours during which the cement slurry is sufficiently fluid to allow it to be pumped down the well and displaced to the desired location in the well. A three-hour period during which the cement is pumpable is preferred. The length of time during which the cement is sufficiently fluid to be pumped is indicated by the time required for the viscosity of an uncontaminated cement slurry to reach 100 poises, which time is generally referred to as the thickening time of the cement slurry. Standard Thickening-Time Tests are described in the API publication, API RP 10B, Eleventh Edition, March 1962, entitled "API Recommended Practice for Testing Oil-Well Cements and Cement Additives." In those tests, viscosities of cement slurries are measured continuously while the temperature and pressure of the cement are increased in accordance with a predetermined schedule.

The formaldehyde in the mixture added to the cement to counteract contamination with organic chemicals can be either in the form of formaldehyde or paraformaldehyde. It is believed that the active form is formaldehyde and that paraformaldehyde, which is a dry powder consisting of a mixture of polyoxymethylene glycols, is converted to formaldehyde upon introduction into a Portland cement slurry. The use of paraformaldehyde is advantageous because it is a solid material which can be mixed with Portland cement in bulk mixing operations and is not destroyed upon subsequent storing. Throughout this specification, the term "formaldehyde" is used to refer to both formaldehyde and paraformaldehyde.

Foramaldehyde is incorporated in the Portland cement in a concentration in the range of 0.2 to 3.0 percent by weight of the dry cement. A preferred concentration is about 1.0 percent. Higher concentrations of formaldehyde than 3.0 percent can be used but increase the tendency of the slurries to entrain air and add to the cost of the slurries. Concentrations of formaldehyde lower than 0.5 percent counteract contaminants in cements, but may not be adequate to counteract the effect of contaminants present in drilling mud in severe cases of dilution of the cement slurry with drilling mud.

Carboxymethyl hydroxyethyl cellulose is a group of ethers of cellulose in which the carboxymethyl $$(-CH_2COOH)$$

group and the hydroxyethyl ($-CH_2CH_2OH$) group are substituted for hydrogen of hydroxyl groups in glucose anhydride units having the formula $C_6H_{10}O_5$. Cellulose molecules are generally believed to be made up of a chain of approximately 2,000 glucose anhydride units. The length of the chain of glucose anhydride units in CMHEC may be reduced to as few as 200 glucose anhydride units to reduce the viscosity of the cellulose. Further modification of the properties of the CMHEC can be obtained by altering the degree of substitution of carboxymethyl and hydroxyethyl groups in the cellulose group as well as by varying the ratio of carboxymethyl to hydroxyethyl groups. CMHEC is supplied in the oil fields by Drilling Specialties Company as the trade-marked product "Diacel LWL." Either the acid or neutral form of CMHEC can be used. If the acid form is used, it is probably rapidly converted to the neutralized form when incorporated in alkaline cement slurries.

The concentration of CMHEC incorporated in Portland cement slurries to decontaminate the cement will depend upon the depth at which the cementing operation is to be performed. If the cementing is in formations having a temperature between 170° and 230° F., approximately 0.1 pound of CMHEC is used per 94 pound sack of Portland cement. Lower concentrations are effective in many instances but are not advisable because of the difficulty in dispersing such small amounts uniformly throughout the cement. At greater depths at which the temperature is higher than about 230° F., the concentration of the CMHEC is increased to 0.2 pound per 94 pound sack of Portland cement. Concentrations of CMHEC higher than 0.2 pound can be used but result in substantially no improvement in the setting properties of the cement, and in practically all instances the concentration of CMHEC should be in the range of 0.1 to 0.3 percent by weight of the cement.

The formaldehyde and CMHEC can be added to dry cement in bulk mixing plants or can be added at the well site directly to the cement slurry. A preferred method of preparing a cement slurry protected against contamination is to add one pound of formaldehyde and either 0.1 or 0.2 pound of CMHEC per 94 pound bag of cement with the mixing water at the well site.

To illustrate the decontaminating effect of a mixture of formaldehyde and CMHEC, a series of tests was run on a 50 percent water slurry of a Class A cement. Test samples were prepared from the slurry by diluting the slurry with aqueous drilling muds of different compositions and adding formaldehyde, CMHEC, or mixtures of formaldehyde or CMHEC to some of the samples as indicated in the following Table I. The drilling muds had the following compositions:

MUD 1

| | | |
|---|---|---|
| Bentonite | lbs./bbl. | 15 |
| Low-yield clay | lbs./bbl. | 31 |
| Gypsum | lbs./bbl. | 5 |
| Calcium carbonate | lbs./bbl. | 1.75 |
| Sodium chloride | lb./bbl. | 0.87 |

MUD 2

Mud 1 plus 15 lbs./bbl. of Q'Broxin*

MUD 3

Mud 1 plus
    15 lbs./bbl. of Spersene**
    5 lbs./bbl. of XP20***
    0.5 lb./bbl. of sodium hydroxide

*A ferrochrome lignosulfonate. (Registered trademark of Puget Sound Pulp & Timber Company.)
**A ferrochrome lignosulfonate distributed by Magnet Cove Barium Corporation.
***A reacted chrome-lignite.

The samples of cement slurries were poured into molds and cured under pressures of 3,000 pounds per square inch at temperatures specified in the API publication entitled, "API Recommended Practice for Testing Oil-Well Cements and Cement Additives" (API RP 10B), for well simulation tests for depths of 6,000 and 8,000 feet. Test samples simulating depths of 6,000 feet were cured at 170° F. and test samples simulating depths of 8,000 feet were cured at 200° F.

*Table I*

| Test No. | Depth (ft.) | $HO \cdot (CH_2O)_n \cdot H$ (percent) | CMHEC (percent) | Mud Addition | 24 Hr. Comp. Strength, p.s.i. |
|---|---|---|---|---|---|
| 1 | 6,000 | 0 | 0 | 20% No. 1 | 3,425 |
| 2 | 6,000 | 1.0 | 0.1 | 20% No. 1 | 2,006 |
| 3 | 6,000 | 0 | 0.1 | 20% No. 3 | 0 |
| 4 | 6,000 | 1.0 | 0.1 | 20% No. 3 | 1,525 |
| 5 | 8,000 | 0 | 0 | 20% No. 2 | 0 |
| 6 | 8,000 | 1.0 | 0 | 20% No. 2 | 1,930 |
| 7 | 8,000 | 1.0 | 0.1 | 20% No. 2 | 1,850 |

A comparison of Tests Nos. 1 and 2 shows the retarding effect of the mixture of formaldehyde and CMHEC. Although the addition of the decontaminant of this invention to an uncontaminated cement slurry reduces the compressive strength of the cement, the compressive strength of 2,006 p.s.i. of the treated cement is more than adequate for use in well cementing operations. Compressive strengths in excess of about 500 p.s.i. are adequate for cementing casing and liners. Cement plugs set for subsequent directional drilling operations should have minimum compressive strengths of 1,000 to 1,500 p.s.i. Contamination of the cement slurry by dilution with 20 percent of a drilling mud containing 15 lbs./bbl. of ferrochrome lignosulfonate completely destroys the set of the cement as illustrated by Test No. 3. Test No. 4 illustrates the ability of the decontaminant to counteract the effects of the contaminant and provide a cement which will set and have a satisfactory compressive strength. Test No. 6 shows that at a high curing temperature of 200° F., formaldehyde alone will counteract contamination of cement slurries containing high concentrations, approximately one percent, of ferrochrome lignosulfonate.

It is imperative that cement slurries remain pumpable for periods long enough to allow the slurry to be placed in the well. In most cementing operations, a period of at least two hours before the cement thickens to a viscosity of 100 poises is desirable, and longer periods of approximately three hours are preferable. If the operation is at depths exceeding 8,000 feet, the longer thickening times are essential.

To determine the effect of the formaldehyde and CMHEC on thickening of cement slurries, a series of tests was run on uncontaminated 46 percent water slurries of two brands of API Class A cement to which had been added formaldehyde and CMHEC as shown in the following Table II. The tests were run in accordance with the thickening time test procedure described in the API bulletin, "API Recommended Practice for Testing Oil-Well Cements and Cement Additives" (API RP 10B, 11th Edition, January 1962). The temperature and pressure were controlled in accordance with the schedules for the depths specified.

*Table II*

| Test No. | Cement | Depth (feet) | HO·(CH$_2$O)$_n$·H (percent) | CMHEC (percent) | Time to 100 Poises (min.) |
|---|---|---|---|---|---|
| 8 | Brand A | ¹4,000 | 0 | 0 | 196 |
| 9 | do | ¹8,000 | 0 | 0 | 98 |
| 10 | do | ¹12,000 | 0 | 0 | 54 |
| 11 | do | ¹4,000 | 1.0 | 0 | 203 |
| 12 | do | ¹8,000 | 1.0 | 0 | 108 |
| 13 | do | ¹12,000 | 1.0 | 0 | 70 |
| 14 | do | 6,000 | 1.0 | 0.1 | 282 |
| 15 | do | 8,000 | 1.0 | 0.1 | 164 |
| 16 | do | 10,000 | 1.0 | 0.1 | 153 |
| 17 | do | 12,000 | 1.0 | 0.1 | 83 |
| 18 | do | 8,000 | 1.0 | 0.2 | 195 |
| 19 | do | 10,000 | 1.0 | 0.2 | 192 |
| 20 | do | 12,000 | 1.0 | 0.2 | 183 |
| 21 | do | 14,000 | 1.0 | 0.2 | 94 |
| 22 | do | 14,000 | 1.0 | 0.3 | 98 |
| 23 | Brand B | 8,000 | 1.0 | 0.1 | 242 |
| 24 | do | 8,000 | 1.0 | 0.2 | 300+ |

¹ 50 percent water slurry.

Slurries containing 50 percent water have slightly longer thickening times than slurries containing 46 percent water, but the difference in thickening time is slight and does not affect the results presented in Table II.

It will be noted from Test No. 12 that the time of thickening to 100 poises of a cement containing one percent formaldehyde is only 108 minutes, even though the maximum temperature of the cement was only 125° F. Hence, although formaldehyde alone is effective in counteracting the contamination of the cement as shown by the strength tests, formaldehyde alone will not provide a cement having a long enough thickening time to permit safe use of the slurry of Test No. 12 at a depth of 8,000 feet.

The results presented in Table II show that 0.1 percent of CMHEC in combination with one percent formaldehyde gives a cement slurry having adequate thickening times for depths of 10,000 feet. If the cementing operation is to be performed at greater depths, satisfactory thickening times can be obtained by increasing the concentration of CMHEC to 0.2 percent. At depths of 14,000 feet the mixture of formaldehyde and CMHEC is not effective in providing a cement having adequate thickening times. Tests Nos. 21 and 22 are of interest principally in showing that an increase in the concentration of CMHEC from 0.2 percent to 0.3 percent had little effect on the pumpability of the slurry. Cementing operations at temperatures corresponding to depths of 12,000 feet or more present no problem insofar as contamination of a cement is concerned. At the high temperatures existing at such depths, setting of the cement is not prevented by the drilling mud chemicals even though no decontaminant is used.

A series of tests run on contaminated Class A cements cured at 260° F. illustrate the ability of contaminated cement slurries to set at high temperatures. The results of the tests are set forth in Table III:

*Table III*

| Test No. | Depth (feet) | HO·(CH$_2$O)$_n$·H (percent) | CMHEC (percent) | Mud Addition | 24 Hr. Comp. Strength, p.s.i. |
|---|---|---|---|---|---|
| 25 | 12,000 | 1.0 | 0.2 | 20% No. 1 | 2,000 |
| 26 | 12,000 | 0 | 0 | 20% No. 2 | 1,782 |
| 27 | 12,000 | 0 | 0.2 | 20% No. 2 | 1,285 |
| 28 | 12,000 | 1.0 | 0.2 | 20% No. 2 | 2,042 |

As shown by Test No. 26 dilution of the cement slurry with a drilling mud containing ferrochrome lignosulfonate does not prevent setting of the cement even though no decontaminant is added to the cement. The incorporation in the cement slurry of 0.2 percent CMHEC in addition to the drilling mud containing the ferrochrome lignosulfonate further retards the setting of the cement but does not completely prevent setting. The novel decontaminant utilized in the various well cementing procedures of this invention causes a small increase in the compressive strength of the cement; hence, the cement compositions prepared in accordance with this invention for temperatures below 260° F. are also suitable for use at higher temperatures.

I claim:
1. A method of cementing a well having a bottom hole temperature exceeding 170° F. comprising pumping a Portland cement slurry containing Portland cement, water in a concentration in the range of 35 to 55 percent by weight of the Portland cement, formaldehyde in a concentration in the range of 0.2 to 3 percent by weight of the Portland cement, and carboxymethyl hydroxyethyl cellulose in a concentration in the range of about 0.1 to 0.3 percent by weight of the cement down the well to the zone of the well to be cemented, and maintaining the cement slurry in place until the cement sets.

2. A method of cementing a well having a bottom hole temperature in the range of 170° to 230° F. comprising pumping a Portland cement slurry containing Portland cement, water in a concentration in the range of 35 to 55 percent by weight of the Portland cement, formaldehyde in a concentration in the range of 0.2 to 3 percent by weight of the Portland cement, and carboxymethyl hydroxyethyl cellulose in a concentration in the range of approximately 0.1 to 0.2 percent by weight of the cement down the well to the zone of the well to be cemented, and maintaining the cement slurry in place until the cement sets.

3. A method of cementing a well having a bottom hole temperature above 230° F. comprising pumping a Portland cement slurry containing Portland cement, water in a concentration in the range of 35 to 55 percent by weight of the Portland cement, formaldehyde in a concentration in the range of 0.2 to 3 percent by weight of the Portland cement, and carboxymethyl hydroxyethyl cellulose in a concentration in the range of approximately 0.2 to 0.3 percent by weight of the cement down the well to the zone of the well to be cemented, and maintaining the cement slurry in place until the cement sets.

References Cited by the Examiner

UNITED STATES PATENTS

| | | | |
|---|---|---|---|
| 2,880,096 | 3/59 | Hurley | 106—93 |
| 2,889,228 | 6/59 | Beach | 106—93 |

TOBIAS E. LEVOW, *Primary Examiner.*

UNITED STATES PATENT OFFICE
CERTIFICATE OF CORRECTION

Patent No. 3,197,316                                                  July 27, 1965

Horace J. Beach

It is hereby certified that error appears in the above numbered patent requiring correction and that the said Letters Patent should read as corrected below.

Column 1, line 40, for "borehold" read -- borehole --; column 2, line 9, for "contaminates" read -- contaminants --; same column 2, line 16, after "carboxymethyl" insert -- hydroxyethyl --.

Signed and sealed this 18th day of January 1966.

(SEAL)
Attest:

ERNEST W. SWIDER                                        EDWARD J. BRENNER
Attesting Officer                                               Commissioner of Patents